United States Patent [19]
Muchow

[11] Patent Number: 6,003,548
[45] Date of Patent: Dec. 21, 1999

[54] PRESSURE VESSEL CLAMP CONNECTOR

[75] Inventor: John Daniel Muchow, Sugar Land, Tex.

[73] Assignee: Hydril Company, Houston, Tex.

[21] Appl. No.: 09/121,752

[22] Filed: Jul. 23, 1998

[51] Int. Cl.[6] .................................................. F16L 23/00
[52] U.S. Cl. ...................... 137/614.05; 251/149; 285/18; 285/364; 285/420
[58] Field of Search .................................. 285/406, 407, 285/408, 409, 410, 18, 411, 920, 364–367, 420; 29/237; 137/614.05; 251/149

[56] References Cited

U.S. PATENT DOCUMENTS

| | | | |
|---|---|---|---|
| 2,788,991 | 4/1957 | Neuhauser | 285/18 |
| 3,026,128 | 3/1962 | Willes | 285/18 |
| 3,233,314 | 2/1966 | Watkins et al. | 29/237 |
| 3,627,358 | 12/1971 | Polston | 285/406 |
| 4,198,076 | 4/1980 | Mezei | 285/18 |
| 4,515,182 | 5/1985 | LeDevehat | 285/408 X |

FOREIGN PATENT DOCUMENTS

| | | | |
|---|---|---|---|
| 645605 | 11/1950 | United Kingdom | 285/406 |
| 828940 | 2/1960 | United Kingdom | 285/18 |

*Primary Examiner*—Dave W. Arola
*Attorney, Agent, or Firm*—Rosenthal L.L.P.

[57] ABSTRACT

A clamping assembly for connecting and disconnecting aligned hubs of a first and a second pressure vessel is provided. The clamping assembly includes a pair of clamp segments and at least one cam in operable engagement with the clamp segments. The clamp segments are movable between a closed position to engage the hubs and an open position to disengage from the hubs. The movement of the clamp segments from the closed position to the open position operates the cam to separate the hubs.

15 Claims, 4 Drawing Sheets

PRESSURE VESSEL CLAMP CONNECTOR

BACKGROUND OF THE INVENTION

TECHNICAL FIELD

The invention relates generally to clamps and, more particularly, to a clamp for connecting two pressure vessels.

BACKGROUND ART

Pressure vessels, e.g., pipes and valves, have hubs that may be held in abutting engagement by a clamp. FIG. 1 shows a clamp 10 that may be used to hold two pressure vessel hubs together. The clamp 10 has clamp segments 12 and 14 that are mounted on a base plate 15. Pivot pins 16 allow the clamp segments 12 to pivot. The clamp segments 12 may pivot to open or close the clamp 10. The pivot pins 16 extend through the clamp segments 12 and 14 into a slot in the base plate 15, thus allowing the clamp segment 14 to move toward or away from the opening 17 as the clamp segments 12 pivot.

A drive mechanism moves the clamp segments 12 and 14 between the open and closed positions. The drive mechanism includes cylindrical members 18 which are mounted to the clamp segments 12. A threaded rod 20 extends through openings in the cylindrical members 18. The threaded rod 20 may be rotated by a motor 21. When the motor 21 rotates the threaded rod 20, the cylindrical members 18 move toward or away from each other. As the cylindrical members 18 move, the clamp segments 12 pivot. The cylindrical members 18 may move toward each other to close the clamp 10 or away from each other to open the clamp 10.

FIG. 2 shows pipes 26 and 28 having hubs 22 and 24 held in abutting engagement by the clamp 10. Hubs 22 and 24 have flanges 30 and 32 with conical shoulders 34 and 36, respectively. The clamp segments 12 and 14 have inner tapered surfaces 38 and 40 which have the same taper angle as the conical shoulders 34 and 36. The clamp segments 12 and 14 are pivoted radially inward toward the hubs 22 and 24 to allow the tapered surfaces 38 and 40 to mate with the conical shoulders 34 and 36, respectively. When the tapered surfaces 38 and 40 mate with the conical shoulders 34 and 36, the hubs 22 and 24 are tightly forced together. The hubs 22 and 24 are released from each other when the clamp segments 12 are pivoted away from the hubs such that the tapered surfaces 38 and 40 disengage from the conical shoulders 34 and 36.

In some applications, one pressure vessel hub may carry a seal that is pushed into a seal bore in an adjoining pressure vessel hub when the hubs are connected by a clamp, e.g., clamp 10 shown in FIG. 1. When the seal is forced into the seal bore, releasing the clamp from the pressure vessel hubs does not result in automatic separation of the hubs from each other. Instead, a secondary mechanical force is generally required to overcome the sealing force between the pressure vessels so that the hubs can be moved apart. Providing a secondary mechanical force to move the hubs apart can be a difficult task, especially when the pressure vessels are remotely located.

SUMMARY OF THE INVENTION

In general, a clamping assembly for connecting and disconnecting aligned hubs of a first and a second pressure vessel comprises a pair of clamp segments movable between a closed position to engage the hubs and an open position to disengage from the hubs. Each clamp segment has a first surface adapted to engage the hubs. The clamping assembly further comprises at least one cam in operable engagement with the clamp segments. The movement of the clamp segments from the closed position to the open position operates the cam to separate the hubs.

DESCRIPTION OF THE PREFERRED EMBODIMENTS

Figure 1:
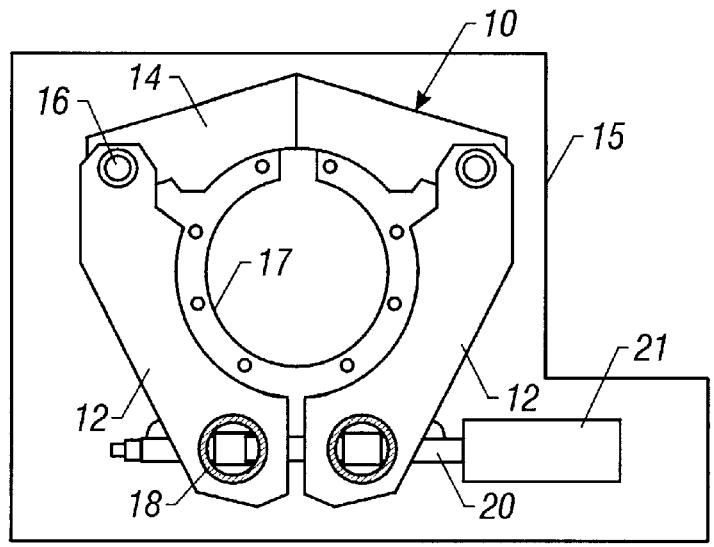
FIG. 1 is a top view of a prior art clamp in the closed position.
Figure 2:
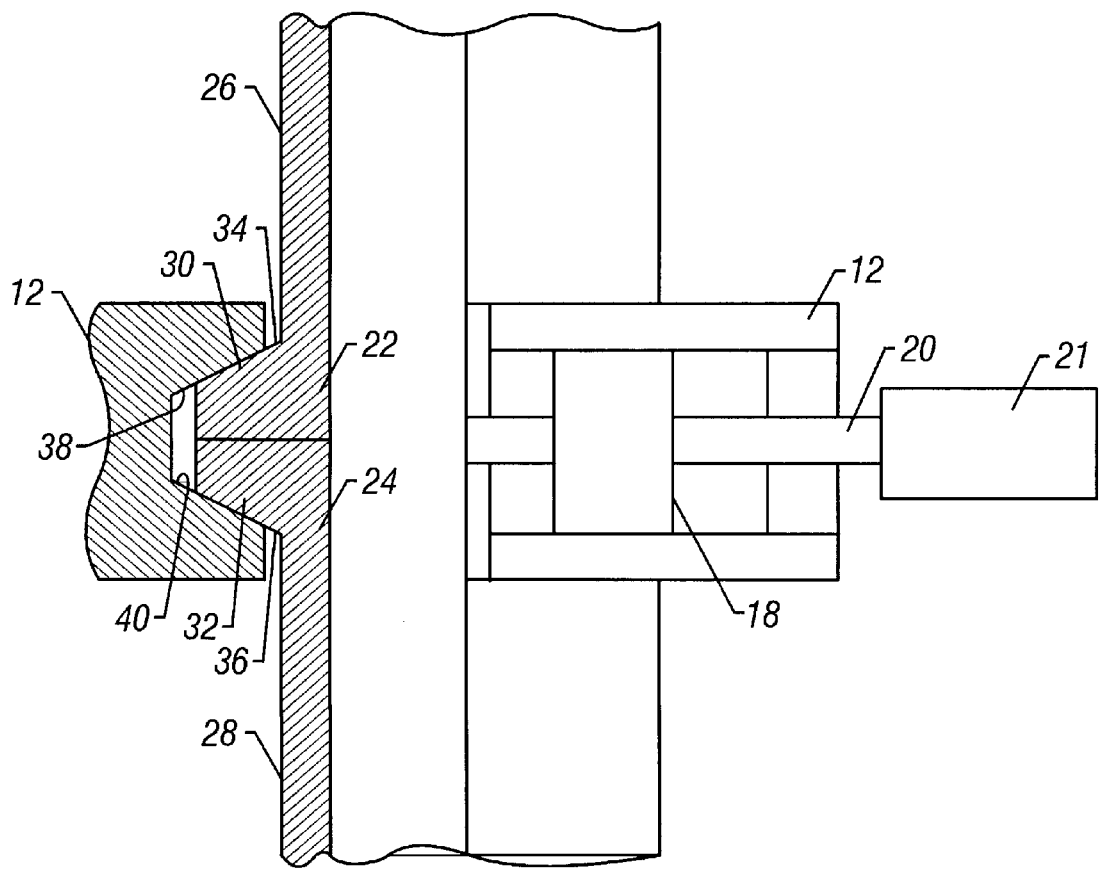
FIG. 2 is a cross-sectional view of pipe hubs held together by the clamp shown in FIG. 1.
Figure 3:
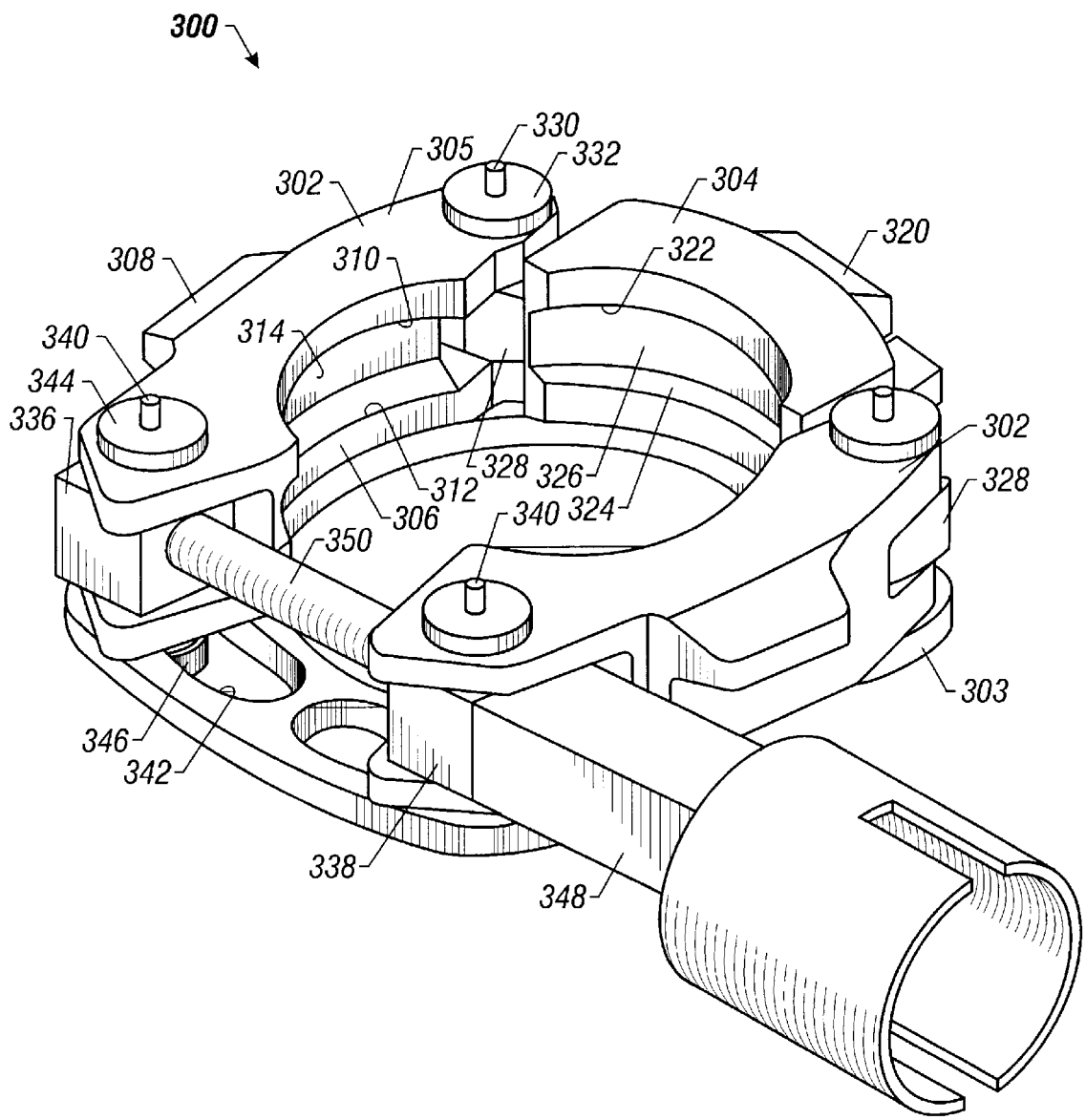
FIG. 3 is a perspective view of a clamp connector.

Referring to the drawings wherein like characters are used for like parts throughout the several views, FIG. 3 illustrates a clamp connector 300 which includes clamp segments 302 and 304. The clamp segments 302 and 304 are supported on a base plate 303. Each clamp segment 302 has an upper portion 305 and a lower portion 306. The upper portion 305 has an outer ramped surface 308 and an inner tapered surface 310. The lower portion 306 has an inner tapered surface 312 arranged opposite the inner tapered surface 310 of the upper portion 305. The inner tapered surfaces 310 and 312 are vertically spaced by an inner surface 314.

The clamp segment 304 has an outer ramped surface 320 and inner tapered surfaces 322 and 324. The inner tapered surfaces 322 and 324 are vertically spaced by an inner surface 326. The clamp segment 304 has projecting lips 328 which are mounted between the upper portions 305 and the lower portions 306 of the clamp segments 302. Pivot pins 330 extend through the upper portions 305, the projecting lips 328, and the lower portions 306 into slots (not shown) in the base plate 303. The pivot pins 330 are secured in place by nuts 332. The pivot pins 330 allow the clamp segments 302 to pivot between open and closed positions. The clamp segment 304 also moves radially inward or outward as the clamping segments 302 pivots and the pivot pins 330 move in the slots (not shown) in the base plate 303.

Plate members 336 and 338 are mounted between the upper portions 305 and the lower portions 306 of the clamping segments 302 by pins 340. The pins 340 extend into guide slots 342 in the base plate 303. The pins 340 are secured in place by nuts 344 and 346. The nuts 346 are arranged to ride in the guide slots 342 as the clamping segments 302 and 304 are moved. An actuating mechanism 348 is attached to the plate member 338. The actuating mechanism 348 includes a shaft 350 which extends through openings in the plate members 336 and 338. The plate member 338 may include bearings which support the shaft 350 for rotation while the plate member 336 threadedly engages the shaft 350. The actuating mechanism 348 includes a motor for rotating the shaft 350.

In operation, the clamp connector 300 is closed by rotating the shaft 350 in a certain direction such that the plate members 336 and 338 move toward each other. As the plate members 336 and 338 move toward each other, the clamp segments 302 move toward each other and pull the clamping segment 304 radially inward. The clamp connector 300 is opened by rotating the shaft 350 in an opposite direction such that the plate members 336 and 338 move away from each other. As the plate members 336 and 338 move away from each other, the clamp segments 302 move away from each other and push the clamp segment 304 radially outward. The guide slots 342 control the travel of pins 340 as the plate members 336 and 338 move away from each other.

Figure 4:
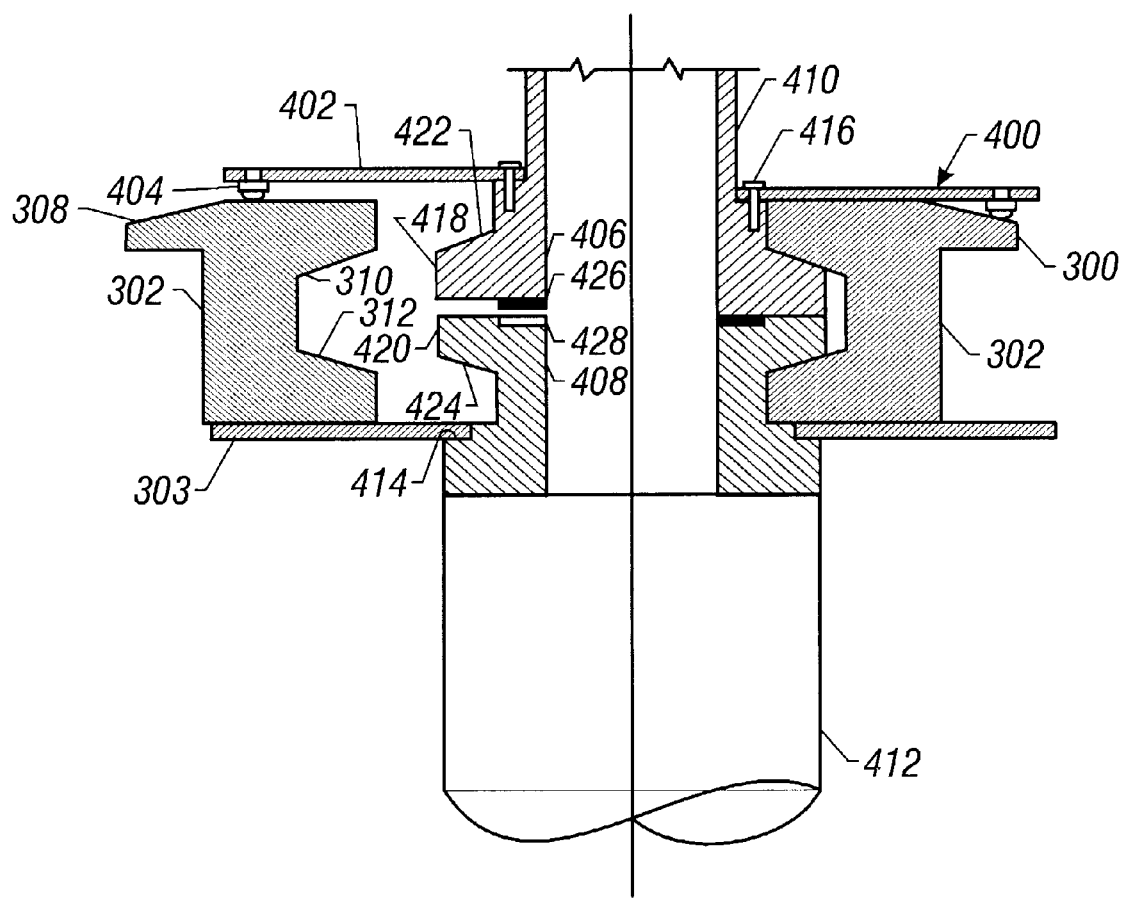
FIG. 4 is a cross-sectional view of a clamp assembly mounted on pressure vessels.

Referring to FIGS. 3 and 4, a clamp assembly 400 comprises the clamp connector 300, laterally extending plate 402, and cams, e.g., pins 404. The pins 404 are shown as rounded pins, but they may also be tapered or flat pins. The pins 404 are positioned opposite the clamp segments 302 and 304. The clamp assembly 400 is supported by hubs 406 and 408 of pipes 410 and 412. The base plate 303 of the clamp connector 300 is mounted on a shoulder 414 of the hub 408 and the laterally extending plate 402 is mounted on a shoulder 416 of the hub 406. The pins 404 are attached to the plate 402. The pins 404 are arranged to ride on the ramped surfaces 308 and 320 of the clamp segments 302 and 304. The hubs 406 and 408 have flanges 418 and 420 with tapered surfaces 422 and 424. The tapered surface 422 has the same taper angle as the inner tapered surfaces 310 and 322 of the clamp segments 302 and 304. Similarly, the tapered surface 424 has the same taper angle as the inner tapered surfaces 312 and 324 of the clamp segments 302 and 304. Hub 406 includes a seal 426 which is arranged to enter the seal bore 428 when the hubs 406 and 408 are forced together.

In operation, the pipe 410 is lowered onto the pipe 412 such that the pins 404 sit on the clamp segments 302 and 304. In this position, there is a gap between the hubs 406 and 408, as shown in the left half of the drawing in FIG. 4. The pipes 410 and 412 are connected by pivoting the clamp segments 302 toward the hubs 406 and 408 until the inner tapered surfaces of the clamp segments 302 contact the tapered surfaces 422 and 424 of the flanges 418 and 420 and force the flanges together, as shown in the right half of the drawing in FIG. 4. The clamp segments 302 also pull the clamp segment 304 radially inward to engage the flanges 418 and 420.

When the clamp segments 302 and 304 are pivoted away from the hubs 406 and 408, the pins 404 ride up the ramped surfaces 308 and 320 of the clamp segments 302 and 304, forcing the clamp segments 302 and 304 away from the pins 404. At the same time, the clamp segments 302 and 304 exert and upward force on the plate 402. The force exerted on the plate 402 overcomes the sealing force of the seal 426, pushes the plate 402, and separates the hub 406 from the hub 408, as illustrated in the left half of the drawing.

Figure 5:
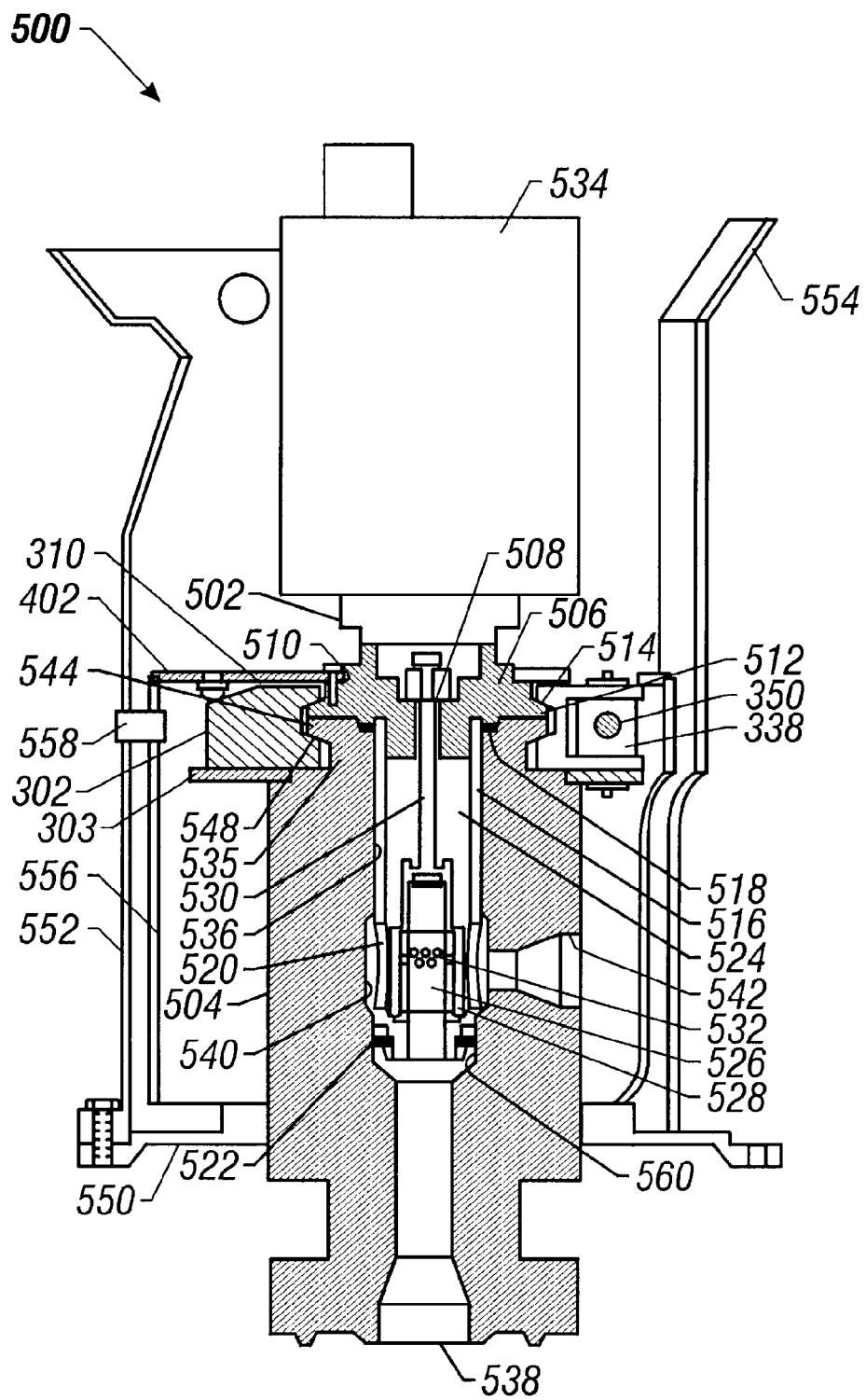
FIG. 5 is a cross-sectional view of a choke valve incorporating the clamp assembly shown in FIG. 4.

Referring to FIG. 5, a choke valve 500 employing the clamping assembly 400 (shown in FIG. 4) is illustrated. The choke valve 500 includes a retrievable valve insert 502 which is received in a valve body 504. The valve insert 502 includes a hub 506. The hub 506 is provided with a bore 508. The laterally extending plate 402 of the clamping assembly 400 is mounted on an outer shoulder 510 of the hub 506. The hub 506 has a flange 512 with a tapered surface 514. The tapered surface 514 has the same taper angle as the tapered surfaces 310 and 322 of the clamp segments 302 and 304. A sleeve 516 is mounted on the hub 506. A seal 518, which may be a pressure-energized metal seal or an elastomeric seal, seals between the valve body 504 and the hub 506. The sleeve 516 includes flow ports 520. A seal 522 is mounted at the lower end of the sleeve 516.

The hub 506 supports a valve stopper assembly 524 which comprises a flow nozzle 526, an annular member 528, and a piston 530. The flow nozzle 526 is attached to the sleeve 516 and includes flow ports 532 which may be connected to the flow ports 520 in the sleeve 516. The piston 530 is connected to the annular member 528 and moves the annular member 528 axially within the sleeve 516. The piston 530 moves the annular member between a first position to allow flow communication between the flow ports 520 and 532 and a second position to prevent flow communication between the flow ports 520 and 532. The piston 530 is operated by an actuator (not shown) that is located in the upper portion 534 of the valve insert 502.

The valve body 504 has a hub 535. The valve body 504 is provided with a bore 536 which terminates in a flow outlet 538. An annular chamber 540 is formed inside the valve body 504. The annular chamber 540 is connected to a flow inlet 542. The hub 535 includes a flange 544 with tapered surface 548. The tapered surface 548 mates with the inner tapered surface of the clamp segments 302 when the clamp connector 300 is in the closed position.

Plates 550 are mounted on the valve body 504. The plates 550 are connected to a housing 552. The housing 552 includes a funnel 554 which helps guide the valve insert 502 into the bore 536 of the valve body 504. The valve insert 502 also includes alignment tubes 556 and pin 558 for proper positioning of the valve insert 502 with respect to the valve body 504.

In operation, the valve body 504 is secured to the valve insert 502 by moving the clamp segments 302 and 304 radially inward to allow the inner tapered surfaces of the clamp segments to mate with the tapered surfaces 514 and 548 on the hubs 506 and 535. When the clamping segments 302 and 304 engage the hub 506 and the valve body 504, the seal 522 is pushed into the seal bore 560. When the clamp segments 302 and 304 are released from the hub 506 and the valve body 504, the pins 404 ride on the ramped surfaces of the clamp segments. The movement of the pins 404 on the ramped surfaces push the clamp segments away from the pins 404. At the same time, the clamp segments exert an upward force on the plate 402. The upward force exerted on the plate overcomes the sealing force of the seal 522 and separates the hub from the valve body.

The invention is not limited to the specific embodiments disclosed. For instance, the laterally extending plate 402 may be mounted on the hub 535 and the clamp connector 300 mounted on the hub 506. The clamp connector 300 may also have only two segments or more than three segments. An actuating mechanism, e.g., a hydraulic actuator, may be used to move the clamp segments to engage or disengage from the hubs.

What is claimed is:

1. A clamping assembly for connecting and disconnecting aligned hubs of a first and a second pressure vessel, comprising:

a pair of clamp segments coupled to a first axially restrained support member on the hub of the first pressure vessel and movable between a closed position to engage the hubs and an open position to disengage from the hubs, each clamp segment having a first surface adapted to engage the hubs;

at least one cam coupled to a second axially restrained support member on the hub of the second pressure vessel, the cam cooperating with a second surface on one of the clamp segments such that relative motion between the cam and the second surface forces the second axially restrained support member in a direction away from the second surface to axially separate sonic hubs; and an actuator coupled to the clamp segments to move the clamp segments between the open and closed positions.

2. The clamping assembly of claim 1, wherein the second surface includes a ramped section and relative motion between the cam and the ramped section forces the second axially restrained support member in a direction away from the second surface.

3. The clamping assembly of claim 1, wherein the cam comprises a pin member.

4. The clamping assembly of claim 1, wherein the first surfaces of the clamp segments include tapers which engage tapers on the hubs when the clamp segments are in the closed position.

5. The clamping assembly of claim 1, further comprising an intermediate clamp segment mounted on the first axially restrained supporting member, the intermediate clamp segment having ends pivotally coupled to the clamp segments so as to link the clamp segments and allow the clamp segments to be pivoted between the open and closed positions.

6. The clamping assembly of claim 1, wherein the actuator comprises a shaft extending through openings in the clamp segments and threadedly engaging at least one of the clamp segments and a motor for rotating the shaft.

7. The clamping assembly of claim 6, further comprising pin members on the clamp segments which extend into guide slots in the first axially restrained support member.

8. The clamping assembly of claim 1, wherein a seal on one of the hubs engages a sealing surface on the other of the hubs when the clamp segments are in the closed position.

9. A clamping assembly for connecting and disconnecting aligned hubs of a first and a second pressure vessel, comprising:

a first support member secured to and axially restrained with respect to one of the hubs;

a pair of clamp segments coupled to the first support member and movable between a closed position to hold flanges on ends of the hubs together and an open position to separate the flanges from each other, each clamp segment having a first surface adapted to engage the flanges and at least one clamp segment having a second surface with a ramped section;

a second support member secured to and axially restrained with respect to the other of the hubs, the second support member being in opposing relation to the first support member when the hubs are aligned; and a cam coupled to the second support member, the cam cooperating with the ramped section such that relative motion between the cam and the ramped section forces the second support member in a direction away from the second surface to axially separate said hubs as the clamp segments move from the closed position to the open position.

10. The clamping assembly of claim 9, wherein the first pressure vessel is provided with a bore, an interior chamber, and inlet and outlet ports communicable with the interior chamber.

11. The clamping assembly of claim 10, further including a valve stopper assembly attached to the hub of the first pressure vessel, the valve stopper assembly comprising:

a sleeve attached to the hub of the first pressure vessel, the sleeve having flow ports in communication with the interior chamber;

a flow nozzle disposed within the sleeve, the flow nozzle having ports in selective communication with the flow ports in the sleeve;

a piston extending through the hub of the first pressure vessel and the sleeve;

an annular member attached to the piston, the annular member for movement between a first position to allow communication between the flow ports in the sleeve and the flow nozzle and a second position to prevent communication between the flow ports in the sleeve and the flow nozzle; and a seal mounted on the sleeve for sealing between the sleeve and the second pressure vessel.

12. The clamping assembly of claim 11, further comprising an actuator for axially moving the piston between the first and second positions.

13. A clamping assembly for connecting and disconnecting aligned hubs of a first and a second pressure vessel, comprising:

a base plate mounted on and axially restrained with respect to the hub of the first pressure vessel;

a pair of clamp segments mounted on the base plate for movement between a closed position to engage the hubs and an open position to disengage from the hubs, each clamp segment having inner tapered surfaces for engaging tapered surfaces on the hubs, wherein a ramped section is provided on at least one clamp segment;

a support member mounted on and axially restrained with respect to the hub of the second pressure vessel;

a cam coupled to the support member and arranged to cooperate with the ramped section such that relative motion between the cam and the ramped section forces the support member in a direction away from the base plate to axially separate said hubs as the clamp segments move from the closed position to the open position; and an actuating mechanism for moving the clamp segments between the open and closed positions.

14. A method for connecting and disconnecting aligned hubs of a first and a second pressure, comprising:

securing a first support member to the hub of the first pressure vessel and a second support member to the hub of the second pressure vessel;

mounting a pair of clamp segments on the first support member and a cam on the second support member;

moving the aligned hubs toward each other such that the cam cooperates with a surface on one of the clamp segments;

moving a first surface of each of the clamp segments toward the hubs to engage the hubs and connect the hubs together; and moving the clamp segments away from the hubs to disengage from the hubs and move the hubs in opposing directions.

15. The method of claim 14, wherein the relative motion between the cam and a ramped surface on one of the clamp segments moves the hubs in opposing directions as the clamp segments are moved away from the hubs.

\* \* \* \* \*

UNITED STATES PATENT AND TRADEMARK OFFICE
CERTIFICATE OF CORRECTION

PATENT NO. : 6,003,548
DATED : December 21, 1999
INVENTOR(S) : John Daniel MUCHOW It is certified that error appears in the above-identified patent and that said Letters Patent is hereby corrected as shown below:

On the title page: Item [56]

*Attorney, Agent, or Firm*, replace "Rosenthal L.L.P." with --Rosenthal & Osha L.L.P.--.

In Column 3, line 22, insert a space between "of" and "the".

In Column 4, line 65, replace "sonic" with --said--.

Signed and Sealed this

Eighteenth Day of July, 2000

Attest:

Q. TODD DICKINSON

Attesting Officer

Director of Patents and Trademarks